3,826,678
METHOD FOR PREPARATION OF BIOCOMPATIBLE AND BIOFUNCTIONAL MATERIALS AND PRODUCT THEREOF

Allan S Hoffman and Gotfried Schmer, Seattle, Wash., assignors to the United States of America as represented by the United States Atomic Energy Commission
No Drawing. Filed June 6, 1972, Ser. No. 260,237
Int. Cl. A61k *17/18, 23/02*
U.S. Cl. 117—81                                      14 Claims

---

ABSTRACT OF THE DISCLOSURE

A method for the preparation of biocompatible and biofunctional surfaces is provided comprising radiation grafting a reactable compound selected from the group consisting of polymers and copolymers onto an inert polymeric substrate and thereafter chemically bonding a biologically active molecule to the reactable compound. Specific embodiments include chemically bonding of human serum albumin, heparin, streptokinase, prostaglandin E-1 and mixtures thereof to hydrogels of varying compositions with or without an intermediate smaller molecule or chemical "arm," such as ε-amino caproic acid or 1,4 diamino butane, the hydrogels having been previously radiation-grafted to tough inert polymeric substrate.

A highly synergistic effect is achieved for hydrogels containing high water contents, e.g., above about 55%, when the chemically bonding of the biologically active molecules is carried out via an intermediate smaller molecule or chemical arm.

For thin film substrates having radiation-grafted thereto hydrogels with —$CO_2H$ pendant functional groups which are activated with a carbodiimide solution, a quick wash of the thin film with ice water is required to effect subsequent chemical bonding of the biologically active molecules to the activated surface. The same technique is also required where a chemical arm is employed which has —$CO_2H$ pendant functional groups.

---

BACKGROUND OF THE INVENTION

The invention described herein was made in the course of, or under, a contract with the United States Atomic Energy Commission. The present invention relates generally to methods for preparing materials for biomedical applications and more specifically to a method of preparing materials which are both biocompatible and biofunctional.

Extensive investigations have heretofore been conducted to find materials which will be biologically and chemically stable towards body fluids over many years of contact. Although this goal has not yet been achieved, a number of promising materials have been developed, especially for blood compatibility. Their surface characteristics may be categorized as being either low polarity (e.g. silicones, carbons), high polarity (e.g., hydrogels, charged surfaces), or biological (e.g., heparin, protein or cell-coated). While silicones of the low polarity group are fairly inert to human tissue, it is well known that slow flowing blood tends to coagulate when in contact with silicone surfaces. This coagulation may be related to adsorption on the surfaces of platelets from blood with the resultant modified surface, probably, being directly responsible for thrombus formation.

Hydrogels, i.e., highly water swollen polymeric gels which may be lightly crosslinked, are of interest and because of their highly hydrated polymer networks have excellent compatibility with body fluids. Unfortunately the very property which makes hydrogels attractive as biomaterials—high hydration (water content—25 to 95%)—renders the materials unsuitable alone where some minimum strength is required. This weakness requires, in general, that the hydrogel be reinforced with fabric or fibers, further crosslinked or coated onto a stronger support.

Concerning biological surfaces, many biologically active molecules of interest have also been "coated" to various substrates, such as by physical adsorption, electrostatic bonding and covalent bonding. For example, in U.S. Pat. 3,453,194 issued on July 1, 1969 in the names of D. R. Bennett et al. for "Anticoagulant Surfaces Produced by Radiation Grafting Heparin to a Silicone Substrate," there is disclosed a silicone article suitable for medical implantation which is prepared by exposing a silicone surface to high energy ionizing radiation and contacting the surface with heparin to effect grafting. The steps are also taught to be reversible.

This method suffers a number of serious drawbacks to providing an article for implantation wherein the surfaces are rendered anti-coagulative of blood which is the very stated object of that invention. First, the method has an extremely low efficiency to grafting heparin to the silicone surface. This is especially true where the heparin is attached after the silicone surface is exposed to radiation. Where the silicone surface is first contacted with the heparin and then exposed to radiation, a much more serious problem is inherently provided to the widespread utilization of such a technique; namely, the unknown properties of the long term stability and/or toxic effects of fragments of natural biological molecules such as heparin which have been exposed to radiation. Moreover, the fact that there are large areas wherein no heparin is attached and thus that the blood would be exposed to silicone surfaces unduly restricts, at best, the use of such implanted articles to areas of only high blood flow. The coagulation of blood when exposed to silicone surfaces occurs much more readily in areas of low flow rates.

It is therefore highly desirable, and a primary object of this invention to provide materials which are biocompatible, especially to blood and tissue fluids, and thus are suitable for various biomedical applications. It is also highly desirable and an object of this invention, to provide materials which, while being biocompatible, are also biofunctional, that is to say materials which have biological activity. Materials exhibiting both biocompatibility and biofunctionality would be useful as improved articles for an even wider variety of end uses.

SUMMARY OF THE INVENTION

These objects, as well as others recognized by those skilled in the biomedical field, are achieved by our discovery that biologically active molecules could be chemically bonded to a preselected reactable compound selected from the group consisting of polymers and copolymers which previously had been radiation-grafted to tough inert polymeric substrates to provide excellent biocompatible/biofunctional surfaces.

In one embodiment of our invention a protein, human serum albumin, was successfully covalently bonded onto hydrophilic hydrogel/polyethylene or polysiloxane radiation-grafted surfaces. In another embodiment of our invention a mucopolysaccharide, heparin, was covalently attached to reactive sites of hydrophilic hydrogel/polysiloxane radiation-grafted surfaces. In still another embodiment an enzyme, streptokinase, which activates plasminogen to produce the fibrinolytic protein, plasmin, was successfully covalently bonded to reactive sites of hydrophilic hydrogel/polysiloxane radiation-grafted surfaces with retention of significant enzymatic activity. Our method is also useful for bonding prostaglandin E-1, a biologically active molecular containing carbon, hydrogen and oxygen, to hydrogel/inert polymeric substrates.

Of significant importance was our finding that biologically active molecules could be chemically bonded to hydrophilic hydrogels via an intermediate smaller molecule or "arm," such as ε-amino caproic acid, and other molecules containing both —NH₂ and —CO₂H groups, as well as 1,4 diamino butane and other diamino compounds, with a completely unexpected synergistic effect when coupled with varying hydrogel compositions. Where, for example, albumin was covalently bonded to reactive —OH groups of polyhydroxyethyl methacrylate ("HEMA") chains in a radiation-grafted hydrogel copolymer of HEMA and N-vinyl pyrrolidone on silicone rubber films, when an ε-amino caproic acid arm was interposed, the amount of albumins immobilized increased with the arm vs. without 8.03 μg./cm.² (with) vs. 3.51 μg./cm.² (without) to 28.21 μg./cm.² (with) vs. 7.06 μg./cm.² (without) as the N-vinyl pyrrolidone/HEMA weight ratio in the grafting solution increased from 1/19 to 10/10 (+80% water in each solution).

Where the hydrogel (or chemical arm) has a CO₂H pendant functional group and is activated with carbodiimide, a quick wash of the thin inert polymeric film in ice water is required in order to subsequently achieve chemical bonding of the biologically active molecule to the activated surface.

Of considerable importance to the biomedical field is the finding that the surfaces prepared by our method enables the preparation of uniquely improved articles for medical implantations. The surfaces produced by our method may be viewed in simple terms as a "synthetic" vascular endothelial surface which is of course nature's own blood compatible surface. The coating on the inert polymer substrate being comprised of a highly hydrated surface of a graft copolymerized hydrogel which, in and of itself is superior, biocompatibly speaking, to the best inert polymeric substance (e.g., silicones) plus biologically active molecules which are in turn chemically bonded either to small molecular "arms" attached to, or directly to reactive sites of the hydrogel provide the unique advance in the art afforded by our method.

Advantageously, in our surfaces the natural biomolecule is never exposed to radiation, completely obviating the heretofore encountered serious problem of fragmenting such molecules in an unknown manner due to exposure to radiation.

RADIATION GRAFTING

In a first step of our process a reactable compound selected from polymers and copolymers is radiation-grafted to an inert polymeric substrate. Selection of the inert polymeric substrate may be varied widely. Many of the well known plastics have already found wide use in the medical implant/article field and are quite suitable. Of course, polysiloxanes (silicones) and polyurethanes, including polysiloxane-polyurethane block copolymers, have wide applicability in the biomedical art and are attractive as selected substrates. Hence, such hydrophobic polymers as polysiloxanes, polyethylene, polyurethane, polystyrene, polyvinylchloride, polyethers, polyesters, polyamides, fluorinated silicone and hydrocarbon polymers, etc., may be utilized as the inert substrate in our process. In addition, other, less hydrophobic polymers as cellulosics are of interest due to their wide use as dialysis membranes.

Beneficially, these polymers have virtually no limitations as to the size, shape or form in which they may be utilized. In this regard thin films, membranes, tubes, hollow fibers, particulate matter are a few forms which are readily amenable to our process.

We employ radiation grafting, which is a conventional technique that is used in many diverse applications, for effecting our coating to the substrate. It is simple and efficient to use. Radiation grafting also affords the preparation of high purity surfaces avoiding contamination by extractable fragments of catalysts that are used in chemical polymerizations. Suitable types of radiation for our graft polymerization includes, high energy electrons, X-Ray or gamma radiations, the last of which may conventionally be supplied from a Co⁶⁰ or Cs¹³⁷ source.

The exposure and times required to effect radiation grafting will depend upon the inert polymer chosen from the substrate and the monomer grafting solution composition and can vary over a wide range. Generally, the doses required to achieve sufficient grafting of hydrogels are much lower than those which will cause significant crosslinking or degradation of the substrate polymer molecules.

In accordance with our method any monomer or monomers which will undergo free radical polymerization and at least one of which can provide reactive sites for chemical bonding of biologically active molecules may be used in our radiation graft (co)polymerization process. The hydrophilic hydrogels produced in this process are highly water swollen (water content—25–95%) polymeric gels which may be lightly crosslinked and contain at least one type of reactive bonding site, e.g., —OH, —NH₂, —CO₂H, —COCl,

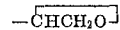

are especially suited for our coatings and are preferred. While the hydrogels may be prepared by polymerization of selected monomers, such as hydroxyethyl methacrylate (HEMA), it is preferred that the hydrogels be formed in an aqueous system by copolymerization of different monomers, some of which may be more reactive toward bonding biologically active molecules than others. Copolymerization permits the production, of a wide range of hydrogel compositions and water contents. Also, it affords higher water content which, due to the increased volume of pores, provides for greatly improved accessibility of reactive sites. One attractive comonomer combination comprises vinyl pyrrolidone (VP) and hydroxyethyl methacrylate (HEMA); other suitable comonomer combinations include: acrylamide and HEMA; glyceryl methacrylate and HEMA, acrylamide or VP; glycidyl methacrylate and acrylamide, HEMA or VP; etc.

Not only will the monomer mixtures be an important variable but the use of solvents in the grafting solution (e.g. alcohols, glycols, dioxane, DMSO, etc.) can also be used to help control the penetration of the grafted (co)polymer into the support polymer, as well as the nature of the water distribution (pores and pore sizes) in the resultant hydrogel.

While the copolymerization may be conducted in an aqueous system of selected monomers, it has been found that methanol as an additive to the system also affords higher grafting levels on polyurethanes in HEMA/methanol/water grafting solutions. A solvent, such as methanol, can have two major effects on the grafting kinetics of our process: (1) homo-polymerization and viscosity buildup in the surrounding solution is retarded, and (2) the inert polymeric substrate tends to swell more as water is replaced in the grafting region by methanol. Both effects lead to greater monomer availability within the surrounding solution. When using only HEMA as the monomer, a suitable range of methanol is between 20% and 100% by weight. Below about 20 weight percent, formation of a hard gel is encountered which tends to retard grafting due to a reduction in the diffusion of residual monomer. The greatest increase in degree of grafting occurs for higher methanol contents and higher monomer contents and is attributable to the enhanced monomer influx in the polymeric substrate when solidification in the surroundings is avoided.

For most biomedical applications the water content of the hydrogel should be above about 50% by weight, preferably between 50 and 95 weight percent. Most hydrogels, in general, have been found to absorb about 25 to 40% water when immersed in water. In order to obtain the higher water contents, the monomers and their concentrations may be varied or selected solvents, such as alcohols, glycols, ethers, sulfoxides, etc., may be employed during grafting to control the molecular structure of the water swollen hydrogel. Where, for example, comonomers of vinyl pyrrolidone and hydroxyethyl methacrylate are used, water content of the resulting hydrogel rises from 33.5% to 64.2% as monomer ratios (VP/HEMA) vary between 0/20 and 10/10 (in 80% $H_2O$).

It should be emphasized here that we have found that a high water content of the hydrogel in combination with bonding of the biologically active molecule to the hydrogel via a chemical arm produces a synergistic effect. The minimum water content for a selected system will vary, depending upon the size of the biologically active molecule, the size of the chemical arm molecule and the size of the biological species reacting with the immobilized molecules. Hence, while streptokinase can be bonded via a chemical arm to a hydrogel having a water content about 55% and retain significant biological activity, heparin requires a higher water content for the achievement of significant biological activity, despite the fact that significant quantities of heparin can be bound via a chemical arm to hydrogels having a water content of 55%. Heparin requires two biologically active molecules, compared with one for streptokinase, to render it biologically active.

This radiation graft step may conveniently be carried out by a variety of methods. In one method the selected inert polymeric substrate is immersed in a solution of the selected monomers and solvents in special reaction vessels.

Another suitable irradiation grafting process comprises preswelling the inert polymeric substrate in the grafting solution, removing the solution (e.g., by pumping), removing air by evacuation and irradiating the swollen polymeric substrate. This process is preferred for grafting to the inside of hollow fiber devices where it is not desired to plug the fibers with radiation-polymerized hydrogels. It may be repeated several times to build up a grafted layer.

Still another irradiation grafting process is to preirradiate the inert polymeric substrate in air to form thermally labile peroxy and hydroperoxy groups, and then to contact the polymeric substrate with the monomer solution, preferably with heating and in the absence of oxygen, to effect the grafting step. This method is not preferred, however.

Care should be exercised to ensure that the polymeric substrate does not contact the walls of the vessel; and although the grafting reaction will take place in the presence of air, it is preferred that the vessel be evacuated (e.g., pressure of 0.1–1 torr) to remove any remaining oxygen.

After essentially all of the oxygen has been removed, the vessel is next irradiated, preferable at room temperature, to effect graft copolymerization; higher temperatures may be used in order to reduce the irradiation time. A convenient source of radiation is the gamma rays from a Cobalt-60 source. Satisfactory radiation graft polymerizations may be achieved with a wide range or radiation dose rates and sources; we used here an average dose rate of 0.25 Mrad./hr. (20,000 curie $Co^{60}$ source for about one hr.). In the absence of a good solvent, there is generally a rapid rise in grafting level during the first half hour.

As the irradiation temperature increases for a given dose and aqueous monomer system, the percent grafting will increase, tending to level out at temperatures above 75° C. Similarly, as the percent of any one monomer increases for a given dose the percent grafting will increase approximately in proportion, although the use of mixed monomers and solvent makes it difficult to generalize in this area.

After irradiation the polymeric substrate is washed in solvent/water mixtures and finally washed in purified water; storage in the wash water is preferred, inasmuch as drying the polymeric substrate tends to lower the water content of the reswelled hydrogel relative to that of the never dried hydrogel.

CHEMICAL BONDING

After the reactable polymer or copolymer has been radiation-grafted to the inert polymeric substrate, selected molecules are chemically bonded to activated reaction sites along the grafted polymer chains to produce a biologically active surface. Examples of molecules which can provide biological activity include proteins (e.g. enzymes, hormones) mucopolysaccharides, nucleic acids, prostaglandins, steroids, amino acids, etc., and mixtures thereof.

The hydrogel surface is preferably "activated" by a suitable reagent, depending upon the reactable pendant functional groups. Where, for example, the reactable functional group is —OH, cyanogen bromide is a suitable activator; where —$NH_2$, thiophosgene is suitable; where —$CO_2H$, carbodiimide is suitable. Each of these activators provides an activated site for subsequent attachment of, for example in the three functional groups above, the —$NH_2$ group(s) on a molecule as a protein.

Other methods for achieving a chemical bonding of the biologically active molecules may include a one-step direct coupling using bifunctional coupling agents, such as glutaraldehyde (to —OH, —$NH_2$ or —COCl surfaces), or diepoxides (to —OH, —$NH_2$, —$CO_2H$ or

surfaces), or diacid chlorides (to —OH, —$NH_2$ or

surfaces).

Where the hydrogel has an —OH group and the activation is carried out with cyanogen bromide, the reaction for attaching a protein molecule having an —$NH_2$ pendant functional group (i.e., human serum albumin) is:

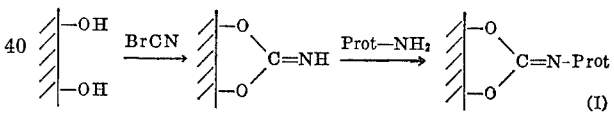

We have found that a synergistic effect could be achieved as the hydrogel composition is varied to cause increasing water contents by utilizing an intermediate small molecule or chemical "arm" which is first bonded to the radiation-grafted polymer or copolymer. This is attributed to the fact that the chemical arm provides greater accessibility to the biologically active molecules of the active bonding group in the polymeric substrate and the changing hydrogel composition, in addition, synergistically creates greater pore volumes for the bonding biologically active molecules to penetrate into. An equation showing the use of a chemical arm, ε-amino caproic acid (ε-ACA), which is bonded to a BrCN activated —OH group and is itself then activated with a carbodiimide, is given below for attaching a protein (albumin) to a hydrogel:

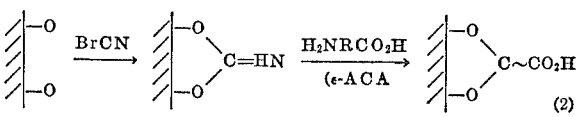

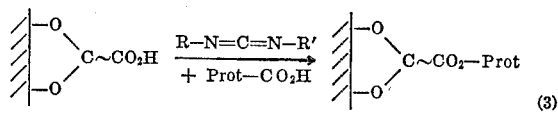

Other suitable intermediates small molecules which may be employed as a chemical "arm" or other amino acids, and diamines or polyamines as putricine. Selection of the hydrogel, activator, chemical arm, and/or biologically active molecule may vary widely, depending upon the type reaction needed and end product desired.

Where an amino acid as ε-amino caproic acid is used as a chemical arm or in general where a hydrogel has a —$CO_2H$ reactable surface and the biologically active molecules are to be attached to the —$CO_2H$ end of the arm, the use of a carbodiimide as water-soluble carbodiimide (1-cyclohexyl-3-[2-morpholinoethyl]carbodiimide) as an activator will cause the formation of a highly unstable form. We have discovered that a very rapid (few seconds) wash in ice water of the activated hydrogel coated polymer is essential to remove excess carbodiimide and permit bonding of proteins, mucopolysaccharides or the like when incubated in the cold for 10–15 hours.

It should be apparent that the materials prepared by our process, being both biocompatible and biofunctional, may be utilized in numerous biomedical applications. One important application of the invention, for example, includes the treatment of enzyme-deficient diseases, such as leukemia, where circulation of blood through, say, hollow-fiber devices on which is immobilized an enzyme as asparaguinase or glutaminase will remove cancer cell nutriants as asparagine and glutamine without the development of significant antibody reactions against the "foreign" enzymes, because they are immobilized. Another application is in the treatment of certain blood disorders. In such cases there are antibodies to the antihemophiliac Factor VIII which inhibit clotting, and if open heart surgery is contemplated, the patient can first be treated by circulating his blood through a contact device (e.g., membrane or hollow fiber device) on which is immobilized Factor VIII to remove these clotting inhibitors so blood behavior will be normal during and after surgery.

A clinic or industrial research application includes, for example, synthesizing polypeptides (proteins) on radiation-grafted hydrogel/inert polymeric substrates. Also, blood banks are now separating and storing platelets and grafting of platelet aggregation inhibitors (e.g., albumin, prostaglandin E-1, theophylline, etc.) to the inside of the storage bag as a means of extending the life time of storage and avoiding the F.D.A. objection to the addition of such agents directly to the platelet dispersions. In general, Table I shows the wide variety of device configurations and potential end-uses possible under this invention.

Borden Chemical Co., was passed through a silica gel column to remove methacrylic acid impurities and was used without further purification.

Various monomer solutions, some with methanol (reagent grade) and/or water (distilled), were prepared and the thin films immersed in the monomer solutions in special reaction vessel, the films being mounted on special holders to keep the films out of contact with the walls of the vessel.

The vessels containing the films were frozen and then evacuated to a vacuum of about 1 torr to remove oxygen and then thawed to observe degassing. The procdure was repeated until essentially no bubbles formed on the surface of the films under vacuum after thawing.

Thereafter the vessels were placed adjacent to a 20,000 curie Cobalt-60 source at room temperature for varying lengths of time; the average dose rate was approximately 0.25 Mrad/hr.

After irradiation the grafted films were removed from the reaction vessel and washed for two hours with pure methanol (changed several times) and then for 24 hours with distilled water (changed often). They were weighed wet (by first patting the surface gently, under fixed pressure with dry filter paper) and then at 0% and 52% relative humidity. Monomer sorption into the untreated films was measured chromatographically after several days immersion of the films in various HEMA/methanol/water solutions.

Results are reported in Table II below as percent HEMA in the dry films, ignoring the sorbed methanol and water.

TABLE II—GRAFTING TO POLYURETHANE FILMS

| Monomer grafting solution | Dose, (Mrad) | Approximate, percent graft |
| --- | --- | --- |
| 20% HEMA | 0.25 | 13 |
| 10% methanol | 0.50 | 10 |
| 70% water | 1.00 | 11 |
| 20% HEMA | 0.25 | 16 |
| 20% methanol | 0.50 | 17 |
| 60% water | 1.00 | 14 |
| 20% HEMA | 0.25 | 20 |
| 35% methanol | 0.50 | 38 |
| 45% water | 1.00 | 43 |

Table I

Useful Applications of Immobilized
Biologically Active Molecules/Hydrogel Surfaces

*As Materials*
1) Non-thrombogenic
2) Tissue compatible
3) Specific biofunction and
*In Devices*
1) Membranes
2) Tubes, hollow fibers
 ) Particle beds (packed or fluidized)
4) Microcapsules (coated or encapsulated)

| For Therapy | Artificial kidney<br>Artificial heart<br>Blood oxygenators<br>Soft or hard tissue substitutes<br>Coatings for sutures<br>Detoxification<br>Enzyme-deficient diseases |
| --- | --- |
| For Instrumentation | Enzyme electrodes<br>Purification of biomolecules<br>Fractionation of cells<br>Coatings for catheters |
| For Industry | Production<br>Purification of products,<br>waste streams |

Further illustration of the quantitative aspects and procedures of the present invention are given in the following examples.

Example I

The feasibility of radiation grafting hydrogel to a polyurethane surface and the significance of using an added solvent as methanol was demonstrated as follows:

Five (5)-mils thick polyurethane films, commercially available from B. F. Goodrich Co. under the trade name "Tuftane," were washed in 0.1% "Ivory" soap solutions for two hours and then washed in distilled water (changed often) for 24 hours, all at room temperature.

Hydroxyethyl methacrylate (HEMA) monomer, commercially available from Monomer-Polymer Division of Example II Hydrogels, composed of homopolymers of hydroxyethyl methacrylate (HEMA) and copolymers of HEMA with N-vinyl pyrrolidone (VP), were radiation-grafted onto thin silicone rubber films (5-mils thick), which are commercially available from Medical Products Division, Dow Corning Co. under the trade name "Medical Grade Silastic," in a similar procedure as given in Example I, except that no solvent was used.

The results are given in Table III below:

TABLE III.—EFFECT OF ADDITION OF N-VP ON THE EXTENT OF GRAFTING AND WATER SORPTION OF THE HYDROGEL

| Grafting solution | | Average | |
|---|---|---|---|
| Percent N-VP* | Percent HEMA* | Percent (dry) graft [a] | Percent water sorbed in hydrogel [a] |
| 0 | 20.0 | 17.5 | 33.5 |
| 2.5 | 17.5 | 21.0 | 34.2 |
| 5.0 | 15.0 | 27.3 | 55.5 |
| 7.5 | 12.5 | 40.5 | 61.3 |
| 10.0 | 10.0 | 45.3 | 64.2 |

[a] After a 0.25 Mrad dose.
* Plus 80% $H_2O$.

Example III

A number of the radiation-grafted hydrogel-silicone rubber films prepared in Example II were then used to demonstrate the feasibility of chemically bonding thereto biologically active molecules of human serum albumin (Merck Pharm. Co., Rahway, N.J.) labeled with $I^{125}$ with and without a chemical arm, $\epsilon$-amino caproic acid ($\epsilon$-ACA, Sigma Chemicals).

The —OH groups on the poly HEMA chains in the grafted hydrogen copolymer were activated by reaction with a 10% solution of BrCN in $0.2M$ $Na_2CO_3$, ph 11.3, for 15 minutes at 15° C. The films were washed and placed in a 10-20% solution of the albumin or chemical arm in $0.2M$ $NaHCO_9/Na_2CO_3$, ph 9.0 for 24 hours in a cold room at 4–7° C.

When the albumin molecules were attached to the —$CO_2H$ functional group of the chemical arm, this group was first activated with a water-soluble carbodiimide (1-cyclohexyl - 3-[2-morpholinoethyl] carbodiimide of Aldrich Labs) by incubating 30 minutes at room temperature at a 10% solution of the carbodiimide at pH 4.75 (0.1 $M$ 2-(N-Morpholino)ethanesulfonic acid commonly identified as "MES," buffer).

The films were then quickly washed in ice water and contacted with a 5–20% solution of the albumin in 0.1 $M$ MES, pH 4.75. Reaction was allowed to proceed for 12 hours in the cold. All blanks were washed for one hour at 37° C. in 1.0 N NaCl.

The bound albumin was measured directly in a gamma-scintillation spectrometer (Packard, Model 3002). The results are given in Table IV below:

TABLE IV.—EFFECT OF HYDROGEL COMPOSITION AND CHEMICAL ARM ON AMOUNT OF ALBUMIN BONDED

| Surface | Bonding type | Albumin bonded ($\mu$g./cm.[2]) | | | |
|---|---|---|---|---|---|
| | | (HEMA/N-VP) | | | |
| | | 19/1 | 18/2 | 15/5 | 10/10 |
| Hydrogel | Physical adsorption | 0.31 | 0.39 | 0.33 | 4.08 |
| Hydrogel plus BrCN | Bonded directly | 3.51 | 3.94 | 4.93 | 7.06 |
| Hydrogel plus BrCN plus $\epsilon$-ACA | Physical adsorption on arm | 1.08 | 0.97 | 5.89 | 4.02 |
| Hydrogel plus BrCN plus $\epsilon$-ACA plus CDI.* | Bonded via arm | 8.03 | 8.58 | 18.43 | 28.21 |

*Carbodiimide.

The synergistic effect achieved by the use of the chemical arm and increased N-VP/HEMA ratio (and thus water content in the hydrogel) is apparent from Table IV. It should be noted that all the blanks were low relative to the covalent bonded albumin.

Example IV

The feasibility of hemically bonding heparin (Sigma Chemicals; $S^{35}$ heparin (Cal. Atomic), 6 mc./g.) to radiation-grafted hydrogel/silicone rubber films with and without a chemical arm, $\epsilon$-amino caproic acid, was demonstrated by the same procedures given in Example III.

Measurement of heparin activity was as follows: Citrated, pooled plasma was heat-defibrinated at 56° C. for three minutes. Under these conditions no loss of heparin cofactor activity was observed. The films containing the immobilized heparin were shaken in this plasma at 37° C. for 10 minutes in order to form the heparin-heparin cofactor complex. The films were then washed in 0.15 $M$ NaCl and contacted with an affinity-purified thrombin solution for two minutes at 37° C. Four ml. of a thrombin solution containing 10 NIH units/ml. were used; 0.1 ml. of this solution can clot 0.2 ml. of a 5 mg./ml. fibrinogen solution in 15 seconds at 28° C. The film was removed and the clotting time of the residual thrombin solution was measured and compared with the 15 second standard clotting time.

The bound heparin was measured in a beta-scintillation counter (Packard, Tri-Card, Model 3320) in Bray solution. The results are given in Table V below:

TABLE V.—BONDING HEPARIN TO HYDROGELS*

| Surface | Bonding type | $\mu$g. Heparin on film | $\mu$g. Heparin/cm.[2] |
|---|---|---|---|
| Hydrogel | Physical adsorption | 16.5 | 1.32 |
| Hydrogel plus BrCN | Bonded directly | 27.1 | 2.06 |
| Hydrogel plus BrCN plus $\epsilon$-ACA plus CDI. | Physical adsorption | 5.7 | 0.44 |
| Hydrogel plus BrCN plus $\epsilon$-ACA plus CDI. | Bonded via chemical arm | 173.0 | 12.60 |

*Hydrogel=5 mil Silastic in 15% HEMA plus 5% N-VP plus 80% $H_2O$; ~0.25 Mrad dose; 27% graft (dry) plus 55% $H_2O$ in graft.

It can be seen once again, as in the case for albumin, that there is a significant increase in the immobilized heparin when an intermediate chemical arm, $\epsilon$-amino caproic acid, is present. The blanks also were low relative to the covalently bonded heparin. It should be noted that for the blank in which a carbodiimide-activate $\epsilon$-ACA chemical arm was allowed to be converted to the inactive byproducts and physical adsorption of heparin on that surface was measured, it was much lower than the total heparin picked up during the covalent bonding step (0.44 $\mu$g./cm.[2] vs. 1260 $\mu$g./cm.[2]) and therefore it is likely that over 90% of the measured values for the heparin bound on the surface of an activated-arm hydrogel is actually covalently bound to the $\epsilon$-ACA arm.

One film was tested for biocompatibility; it had 95 $\mu$g. of heparin immobilized on it via an $\epsilon$-ACA arm. Since 12 $\mu$g. of heparin (2 units) mixed with 1 ml. of plasma can neutralize 90 NIH units of thrombin, it is clear that the 95 $\mu$g., if active, would be more than enough to effect the clotting time of the 40 NIH units of thrombin used in the assay. However, it was found that the clotting time only increased 20% (from 15 to 18 seconds) relative to the blank, and it is felt that this is not a significant increase.

It is possible that the biological activity of immobilized heparin requires a more accessible heparin molecule than a 55% water content plus $\epsilon$-ACA chemical arm provides since heparin must form a complex with both heparin cofactor (anti-thrombin II) and thrombin, and these are molecules with molecular weights of 64,000 and 34,000 respectively. Heparin is an active anticoagulant when immobilized via an ε-ACA chemical arm on an agarose gel at 96% water content (which probably permits entry of all globular molecules under about 1,000,000 in molecular weight.

It may thus be observed that both the hydrogel water content (porosity) and the chemical arm are important in achieving a high biological activity of an immobilized molecule.

Example V

The feasibility of chemically bonding streptokinase ("Varidase," Lederle Labs.) to hydrogel/silicon rubber films with and without a chemical arm, ε-amino caproic acid was demonstrated by the same procedures given in Example III.

Measurement of streptokinase activity was made as follows: The films containing the immobilized streptokinase were shaken in an excess of affinity—purified plasminogen (10 CTA units in 10 ml. of 0.3$M$ imidazole:HCl, pH 7.35) at 37° C. Every 30 minutes an aliquot was removed from the solution and washed through an immobilized radiotagged ($I^{125}$) casein-agarose column. The release of radioactivity from this column was used as a measure of the plasmin activity in the aliquot. The caseolytic and fibrinolytic actions of plasmin are directly related. The results are given in Table VI below:

TABLE VI.—RELEASE OF RADIOACTIVITY FROM A RADIOTAGGED CASEIN-SEPAROSE COLUMN DUE TO PLASMINOGEN ACTIVATION BY IMMOBILIZED STREPTOKINASE

|  | Bonding type | Radioactivity release from column (in c.p.m.) after— | | | | |
| --- | --- | --- | --- | --- | --- | --- |
|  |  | 30 min. | 60 min. | 90 min. | 180 min. | 300 min. |
| Streptokinase on surface of— |  |  |  |  |  |  |
| Hydrogel | Physical adsorption | 194 | 402 |  |  |  |
| Hydrogel plus BrCN | Bonded directly | 607 | 1,254 |  |  |  |
| Hydrogel plus BrCN plus ε-ACA | Physical adsorption | 323 | 688 | 1,005 | 2,143 | 2,107 |
| Hydrogel plus BrCN plus ε-ACA plus CDI | Bonded via arm | 1,287 | 2,573 | 3,659 | 3,667 | 3,670 |

It can be seen from Table VI that a significant fibrinolytic activity is retained by this immobilized enzyme, especially when it is bonded via a chemical arm. The maximum amount of plasmin activated is equivalent to that contained in about 10–15 ml. of plasma. In view of the heparin results, it should be noted that even though plasminogen and plasmin are large molecules (molecular weights of 143,000 and 140,000 respectively), the biological activity of streptokinase is related to its enzymatic action and is therefore quite different in nature from the heparin/heparin cofactor/thrombin complex formed with a biologically active heparin molecule.

It is to be understood that the foregoing examples are merely illustrative and are not intended to limit the scope of this invention, but the invention should be limited only by the scope of the appended claims.

What is claimed is:

1. A process for preparing biocompatible and biofunctional surfaces comprising the steps of: radiation grafting a reactable hydrophilic hydrogel onto an inert organic polymeric substrate, chemically activating said radiation grafted hydrophilic hydrogel by contacting said hydrogel with a compound selected from the group consisting of cyanogen bromide, thiophosgene and carbodiimide; and thereafter contacting the resulting activated surface with an aqueous solution of a biologically active molecule to thereby chemically bond said biologically active molecule to said hydrophilic hydrogel.

2. The process of claim 1 wherein said hydrogel has —OH, —$NH_2$, —$CO_2H$, —COCl, and

pendant functional groups.

3. The process of claim 1 wherein said inert organic polymeric substrate comprises a polymer selected from the group consisting of polyethylene, polyurethane, polysiloxane, polysiloxane-polyurethane block copolymers, cellulosics, and fluorinated silicone polymers and fluorinated hydrocarbon polymers.

4. The process of claim 1 wherein said biologically active molecule is selected from the group consisting of human serum albumin, heparin, streptokinase, prostaglandin E-1 and mixtures thereof.

5. The process of claim 1 wherein said hydrophilic hydrogel has a water content above about 50% by weight and said chemical bonding is effected by contacting said chemically activated hydrophilic hydrogel with a solution of a reactable compound to bond said reactable compound to the surface of said hyrophilic hydrogel, said reactable compound providing an intermediate chemical arm and subsequently activating said reactable compound and thereafter chemically bonding a biologically active molecule to the resulting activated surface of said reactable compound.

6. The process of claim 5 wherein said reactable compound comprises a compound selected from the —$CO_2H$ pendant functional group, said activation of said reactable compound is effected with carbodiimide and said biologically active molecule is selected from the group consisting of human serum albumin, heparin, streptokinase, prostaglandin E-1 and mixtures thereof.

7. The process of claim 5 wherein said hydrophilic hydrogel is bonded to a thin inert organic polymeric film and has a —$CO_2H$ pendant functional group, said reactable compound comprises ε-amino caproic acid, said activation of said reactable compound is effected by incubating at room temperature in a 10% solution of carbodiimide for a period of about 30 minutes and thereafter quickly washing the treated film in ice water, and said chemical bonding step is carried out by contacting said film with a 5–20% solution of said biologically active molecule in 0.1 $M$ 2-(N-morpholino)-ethanesulfonic acid at a pH of 4.75.

8. The process of claim 7 wherein said biologically active molecule is selected from the group consisting of human serum albumin, heparin, streptokinase and mixtures thereof.

9. The process of claim 8 wherein said chemical bonding is carried out with a solution of a biologically active molecule selected from the group consisting of human serum albumin, heparin, streptokinase and mixtures thereof and a bifunctional coupling agent selected from the group consisting of glutaraldehyde, diepoxides and diacid chlorides.

10. The process of claim 1 wherein said chemical bonding step is effected by contacting the hydrogel surface with a solution containing a biologically active molecule and a bifunctional coupling agent whereby said hydrogel surface is activated and said biologically active molecule is chemically bonded thereto in a single direct coupling step.

11. The process of claim 10 wherein said hydrogel has —OH, —$NH_2$, —$CO_2H$, and

pendant functional groups.

12. An article suitable for biomedical applications having both a biocompatible and biofunctional surface, said article having a surface composed of a radiation-grafted highly hydrated hydrophilic hydrogel, said hydrogel having chemically bonded thereto biologically active molecules, said article being prepared in accordance with the process of claim 1.

13. The article of claim 12 wherein said biologically active molecules are bonded to a chemical arm which is in turn bonded to said hydrogel.

14. The article of claim 12 wherein said chemical arm comprises ε-amino caproic acid.

References Cited
UNITED STATES PATENTS

| | | | |
|---|---|---|---|
| 3,453,194 | 7/1969 | Bennett et al. | 117—93.31 X |
| 3,457,098 | 7/1969 | Leininger et al. | 424—183 X |
| 3,617,344 | 11/1971 | Leininger et al. | 117—93.31 X |
| 3,677,800 | 7/1972 | Wright | 117—93.31 |
| 3,457,347 | 7/1969 | Rubricius | 424—183 |
| 3,607,848 | 9/1971 | Stoy et al. | 204—159.16 X |
| 3,703,406 | 11/1972 | Sakurada et al. | 117—93.31 X |

RALPH HUSACK, Primary Examiner

U.S. Cl. X.R.

3—1, Dig. 2; 117—83, 84, 93.31, 118, 138.8 B; 128—214 B, 349 R; 204—159.16; 424—35, 36, 177, 183